United States Patent
Suzuki (10) Patent No.: US 7,525,881 B2
(45) Date of Patent: Apr. 28, 2009

(54) RECORDING APPARATUS HAVING PLAYLIST EDITING FUNCTION

(75) Inventor: Koichiro Suzuki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/850,848

(22) Filed: Sep. 6, 2007

(65) Prior Publication Data

US 2008/0008056 A1  Jan. 10, 2008

Related U.S. Application Data

(62) Division of application No. 10/872,502, filed on Jun. 22, 2004, now Pat. No. 7,283,429.

(30) Foreign Application Priority Data

Jul. 4, 2003  (JP)  ............................. 2003-192015

(51) Int. Cl.
    *G11B 7/085* (2006.01)
    *H04N 5/76* (2006.01)
(52) U.S. Cl. ..................... 369/30.09; 386/125; 386/95
(58) Field of Classification Search ............. 369/30.09, 369/30.08, 30.28, 47.1, 53.1, 30.13, 30.06; 386/95, 124–126, 98, 104, 69, 46, 117; 715/723, 715/724; 702/188; 348/208.4, 208.99; 257/355; 713/193
See application file for complete search history.

(56) References Cited

U.S. PATENT DOCUMENTS

| | | | | |
|---|---|---|---|---|
| 6,002,995 A | 12/1999 | Suzuki et al. | ............... | 702/188 |
| 6,157,767 A | 12/2000 | Suzuki | ............... | 386/1 |
| 6,795,116 B1 | 9/2004 | Akasawa | ............... | 348/231.6 |
| 7,046,915 B2 | 5/2006 | Ando et al. | ............... | 386/95 |
| 7,283,429 B2* | 10/2007 | Suzuki | ............... | 369/30.09 |
| 2002/0197058 A1 | 12/2002 | Suzuki et al. | ............... | 386/69 |
| 2004/0201744 A1 | 10/2004 | Akasawa | ............... | 348/231.6 |
| 2004/0252593 A1 | 12/2004 | Kudo | ............... | 369/30.08 |

FOREIGN PATENT DOCUMENTS

| | | |
|---|---|---|
| JP | 11-146334 | 5/1999 |
| JP | 11-232440 | 8/1999 |
| JP | 11-297050 | 10/1999 |
| JP | 11-339446 | 12/1999 |
| JP | 2002-354426 | 12/2002 |
| JP | 2003-016764 | 1/2003 |
| WO | WO 99/25114 | 5/1999 |

OTHER PUBLICATIONS

Jul. 29, 2008 Japanese Official Action in Japanese Patent Appln. No. 2003-192015 (with partial translation).

* cited by examiner

*Primary Examiner*—Ali Neyzari
(74) *Attorney, Agent, or Firm*—Fitzpatrick, Cella, Harper & Scinto (57) ABSTRACT

A recording apparatus comprising a recording portion for recording moving image data on a recording medium, a recording instruction portion for instructing start and temporary stop of recording the moving image data, a playlist processing portion for producing playlist data indicating a reproduction procedure of the moving image data of a plurality of clips recorded on the recording medium; and a control portion for displaying on a display device a representative image indicating each clip of the moving image data designated in the playlist during temporary stop of recording the moving image data.

7 Claims, 10 Drawing Sheets

```
#PLAYLIST
/video/20030505/clip0010.mpg
/video/20030505/clip0011.mpg
/video/20030505/clip0012.mpg
```

FIG. 6

```
#PLAYLIST
/video/20030505/clip0010.mpg
/video/20030505/clip0011.mpg
/video/20030505/clip0012.mpg
/video/20030505/clip0013.mpg
```

FIG. 7

```
#PLAYLIST
/video/20030505/clip0010.mpg
/video/20030505/clip0011.mpg
/video/20030505/clip0012.mpg
/video/20030505/clip0014.mpg
/video/20030505/clip0013.mpg
```

RECORDING APPARATUS HAVING PLAYLIST EDITING FUNCTION

This application is a division of application Ser. No. 10/872,502 filed Jun. 22, 2004 now U.S. Pat. No. 7,283,429.

BACKGROUND OF THE INVENTION

1. Field of the Invention

The present invention relates to a recording apparatus, particularly to a device having a function of processing playlist data showing a reproduction procedure of recorded image data.

2. Description of the Related Art

In recent years, a disc recorder has appeared which records image data onto a disc medium. This type of device has a function of reproducing the image data recorded on the disk, in an optional reproduction order without processing the image data by the use of a playlist file in which a reproduction order of the image data recorded on a disc is designated.

A user has heretofore edited this playlist file in a reproduction mode or an edition mode to change the reproduction procedure. A technique related to the playlist is described in Japanese Patent Application Laid-Open Nos. H11-146334 and 2002-354426 (filed by the same assignee as that of the present application, having is corresponding U.S. application whose Ser. No. is 10/152,829).

However, it has heretofore been necessary to switch a recording/photographing mode to an editing mode to perform editing processing of the playlist, in a case where the user wishes to change the reproduction procedure by using the playlist, and it has not been possible to change or confirm the reproduction procedure immediately after the photographing, for example, during photographing pausing.

Furthermore, when the photographing is performed after editing the playlist in the editing mode, the photographing has to be performed after switching the device back to the recording/photographing mode, and the photographing cannot be performed immediately after confirming or changing the reproduction procedure.

SUMMARY OF THE INVENTION

An object of the present invention is to solve the above-described problem.

Another object of the present invention is to easily confirm a content of a playlist showing a reproduction order so that the content can be changed.

Still another object of the present invention is to make it possible in a simple method to record of image data or photograph quickly after changing a reproduction procedure by the playlist.

To achieve the objects, according to the present invention, as an aspect of the present invention, a recording apparatus comprising:

recording means for recording moving image data in a recording medium;

recording instruction means for instructing start and temporary stop of recording the moving image data by the recording means;

playlist processing means for producing playlist data indicating a reproduction procedure of the moving image data of a plurality of clips recorded on the recording medium; and control means for displaying on a display device a representative image indicating each clip of the moving image data designated in the playlist during temporary stop of the recording the moving image data by the recording means, instructed by the recording instruction means.

Objects and characteristics other than those described above in the present invention will be apparent by detailed description of embodiments of the present invention with reference to the following drawings.

DETAILED DESCRIPTION OF THE PREFERRED EMBODIMENTS

Embodiments of the present invention will be described.

Figure 1:
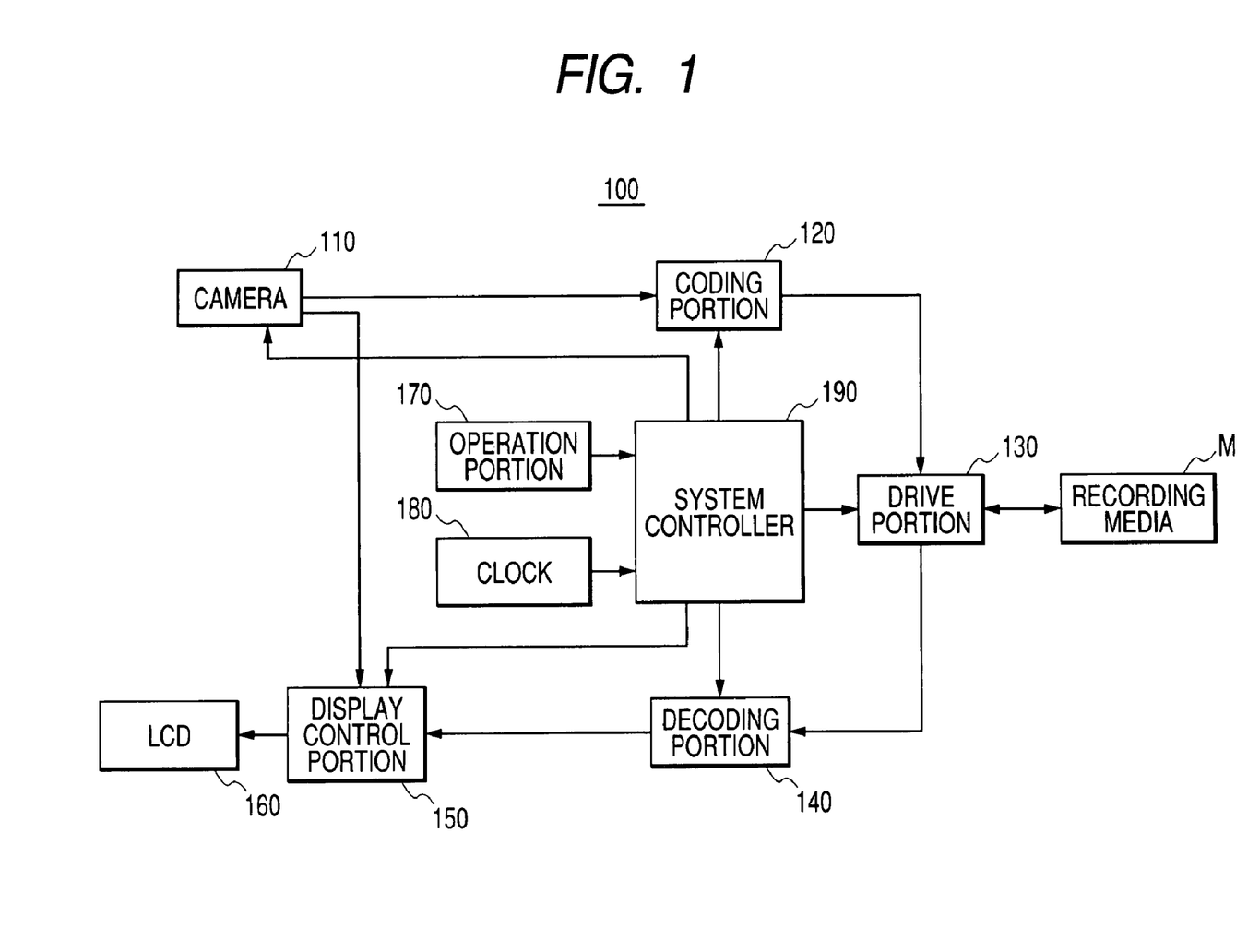
FIG. 1 is a diagram showing a constitution of hardware of a photographing device in an embodiment of the present invention.

FIG. 1 is a diagram showing a constitution of hardware of a photographing device 100 to which the present invention is applied. The constitution of FIG. 1 will be described hereinafter.

In FIG. 1, reference numeral 110 denotes a camera portion which outputs photographed video image in a form of a digital signal. Reference numeral 120 denotes a coding portion which codes the digital video signal sent from the camera portion 110 in accordance with an MPEG2 system to output an MPEG2 stream. Reference numeral 130 denotes a driving portion which records the MPEG2 stream sent from the coding portion 120 onto media M and which reproduces the MPEG2 stream from the media M. The media M are random accessible media such as disc media and memory card media.

Reference numeral 140 denotes a decoding portion which decodes the MPEG2 stream sent from the driving portion 130 to output a decoded digital video signal. 150 denotes a display control portion which produces a video signal for display by synthesizing the digital video signal from the decoding portion 140 or a moving image signal from the camera portion 110 with a user interface or display for warning or the like based on an instruction from a system controller 190, and which produces a video signal of a display screen in a playlist photographing mode described later. 160 denotes a liquid crystal display (LCD) which performs the display based on the video signal sent from the display control portion 150. 170 denotes an operation portion including various switches such as a recording start/temporary stop switch, a power switch, and a switch between a photographing mode and a reproduction/edition mode. A user can optionally operate various switches of the operation portion 170 to instruct the operation of the photographing device. 180 denotes a clock which counts date and time. 190 denotes a system controller which controls the whole photographing device 100.

Figure 2:
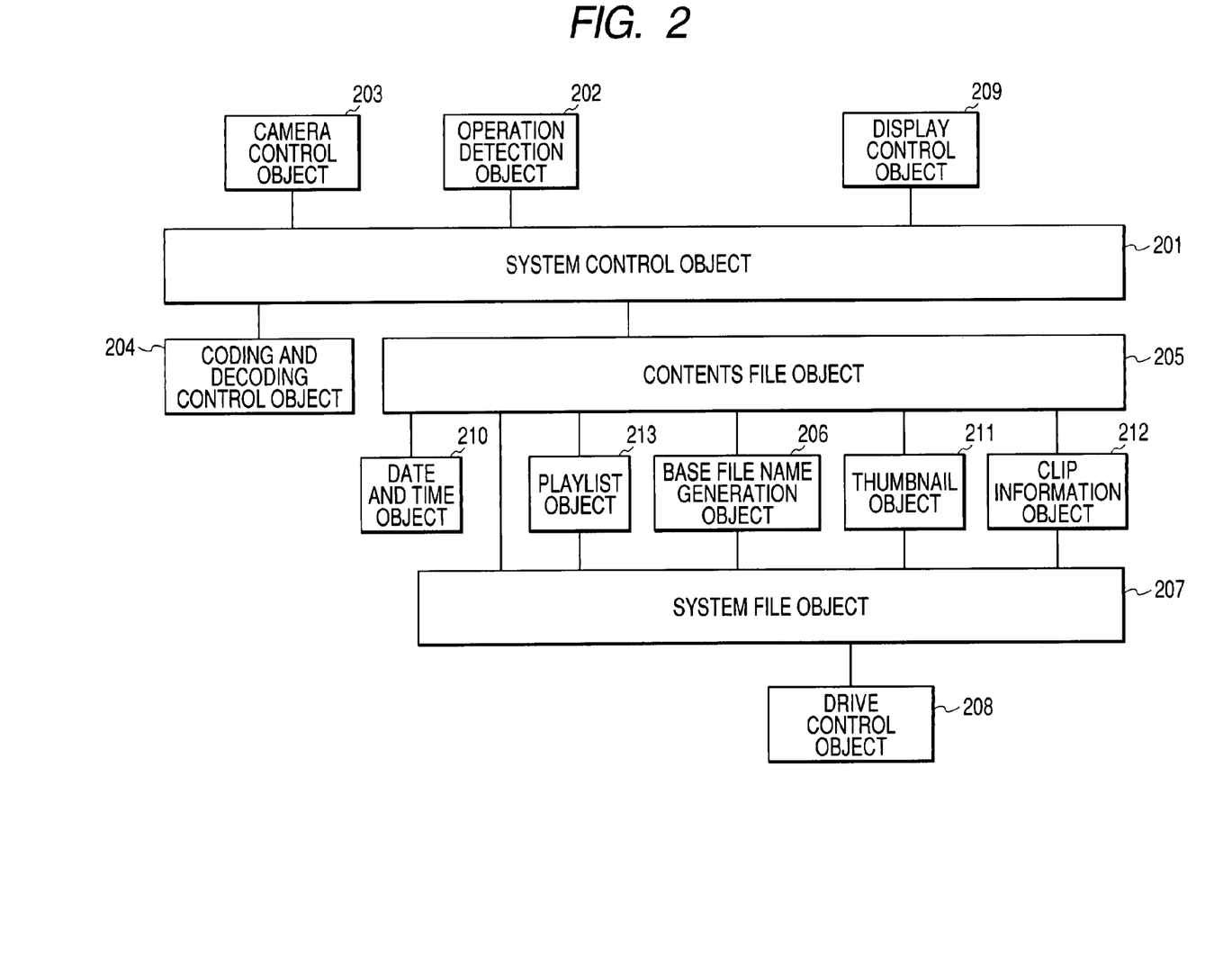
FIG. 2 is a diagram showing a software constitution of a system control unit.

FIG. 2 is a diagram showing a software constitution of the system controller 190 of FIG. 1.

In FIG. 2, reference numeral 201 denotes a system control object which controls the whole photographing device 100. 202 denotes an operation detection object which monitors the operation portion 170 to produce a message in accordance with user's switch operation. 203 denotes a camera control object which controls the camera portion 110. 204 denotes a coding and decoding control object which controls the coding portion 120 and the decoding portion 140. 205 denotes a contents file object for managing a plurality of files constituting a video clip or playlist as described later. 206 denotes a base file name generation object for producing a unique base file name required when recording a plurality of video clips and playlists on the media M, so that different character strings are produced every generation.

Reference numeral 207 denotes a file system object which controls a driving control object 208 to manage the directory and file on the media M. 208 denotes a driving control object which controls the driving portion 130. 209 denotes a display control object which controls the display control portion 150. 210 denotes a date and time object which manages the current date or time.

Reference numeral 211 denotes a thumbnail object which produces a thumbnail image to produce a thumbnail file. 212 denotes a clip information object which collects information on the clip, playlist or the like to produce the clip information file. 213 denotes a playlist object which produces a playlist file and manages the content of the file.

Figure 3:
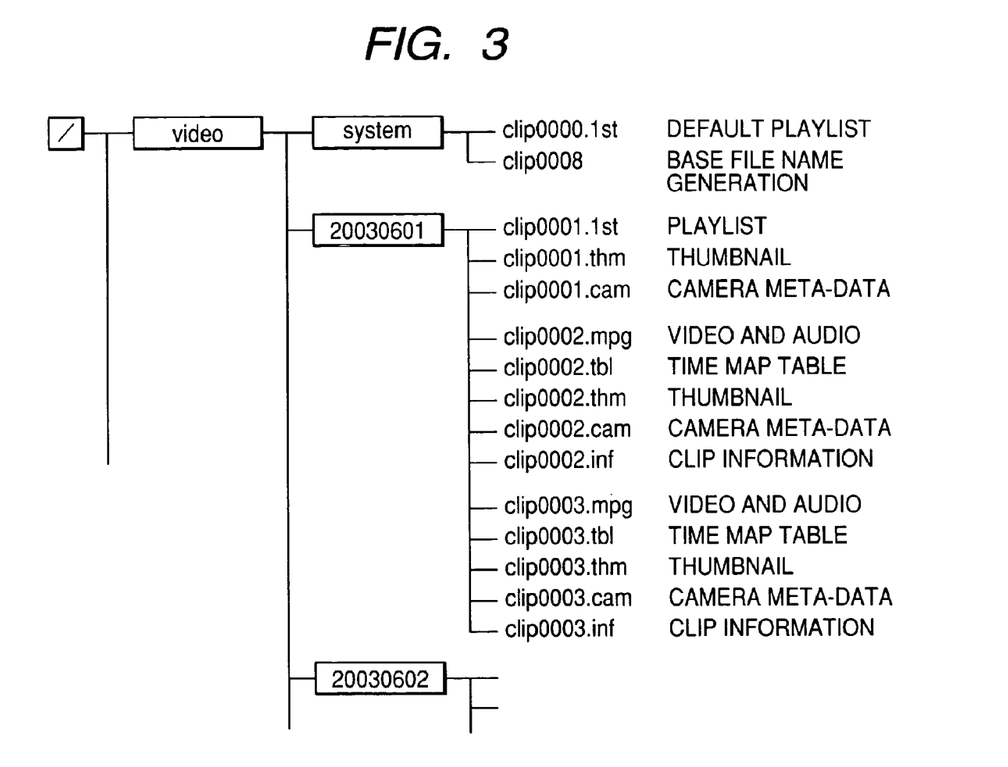
FIG. 3 is a diagram showing a structure of directory or file recorded on recording media.

FIG. 3 is a diagram showing a structure of directory or file stored on the media M.

In FIG. 3, "video" indicates a video directory. The video directory is stored in a root directory of a random access media to be subjected. Moreover, all related directories and files are stored in the video directory. The directories and files stored in the video directory will be described hereinafter.

A system directory is indicated by "system". The system directory is stored right under the video directory. Files required for managing the whole media are stored in the system directory. "clip0000.lst" indicates a default playlist file. The default playlist file is stored right under the system directory. The default playlist file is a file for designating a reproduction order in a case where all the clips stored on the media M are reproduced.

Figure 4:
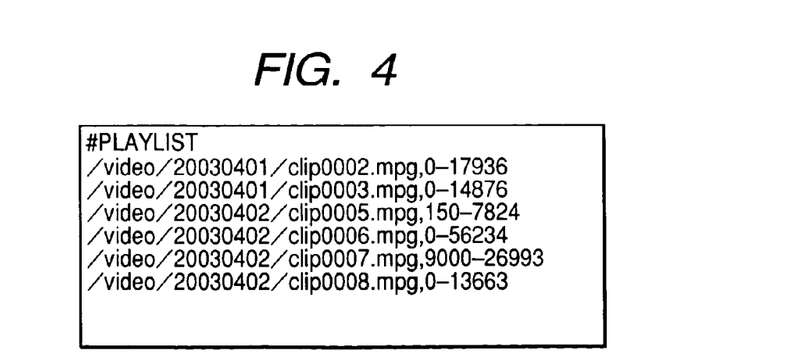
FIG. 4 is a diagram showing a content of a playlist file.

FIG. 4 is a diagram showing a content of a typical playlist file in the present embodiment.

The playlist file is data indicating the reproduction procedure of a moving image clip or the like, and is a file of a text type, in which a file name, start frame information, and end frame information are arranged and described in accordance with a reproduction order with respect to the moving image clip or the like.

In the start frame information and the end frame information, frame numbers are interconnected via a hyphen, and this character string is stored after the file name interposing a comma therebetween.

Either or both of the start frame information and the end frame information may be omitted. That is, when the frame number of a start frame is not described, the reproduction from the first frame of the clip is instructed. When the frame number of the end frame is not described, the reproduction to the last frame of the clip is instructed. Furthermore, when neither are described, the reproduction to the last frame from the first frame of the clip is instructed.

The content of the playlist file is rewritten. by a change instruction of the reproduction order of the moving image clip by the user. The default playlist file is a type of the playlist file, and is automatically rewritten by a photographing operation.

In FIG. 3, "clip0008" is a base file name generation file. The base file name generation file is stored right under the system directory. To newly produce the file of the video clip or the playlist, an unused base file name (file name excluding an extension) is required. This file is used to make a unique file name of the video clip or the playlist. The name of the file is clip with subsequent four digit numbers, and a numeric portion of the name changes every time the base file name is produced. The name of the file is a base file name already used. In the base file name for the new video clip or playlist, four numbers included in the base file name of the file are assumed as a four-digit numeric value, to add 1 thereto, thereby also changing the file name. Moreover, the name of the file is rewritten. Every time the new base file name is requested, the name of the video clip file or the playlist file to be newly produced is determined according to the procedure, and accordingly collision of the file names can be avoided. It is to be noted that an initial value of the name of the file is clip0000.

A directory having a name comprising eight digit numbers such as 20030601 and 20030602 is a contents directory. The contents directory is stored right under the video directory. The file concerning the video clip or the playlist is classified and managed by dates. The names of the directories are automatically determined from a date when the video clip is recorded or a date when the playlist is stored.

Concretely, four digit numbers indicating Anno Domini of the recording/storing date, two digit numbers indicating January to December in 01 to 12 on the date, and further two digit numbers (0 is supplemented if necessary) indicating days in the date are interconnected in this order to form a eight digit character string.

By the use of the name comprising eight digit numbers in this manner, for example, it can be seen that the file recorded/stored in Jun. 1, 2003 is stored in directory 20030601 of FIG. 3. The files recorded/stored on the same day are all stored in the same directory.

Moreover, in the present embodiment, one moving image clip comprises five files including a stream file, time map table file, thumbnail file, camera meta-data file, and clip information file.

The stream file is a file in which a program MPEG2 stream is stored, and the MPEG2 stream includes moving image data and audio data.

The time map table file is a table in which a reproduction time represented by the frame is associated with the position of a packet in the stream file, and special reproduction or jump is possible. The time map table file is not essential in a case where the special reproduction or jump is not performed.

The thumbnail file is a file in which representative image data representative of the clip is stored. In the present embodiment, a frame is extracted from a moving image stream, a size of the frame is reduced into a predetermined size, and thereafter the data is coded in a JPEG system to produce representative image data. The representative image in the thumbnail file is displayed in a playlist photographing mode or a reproduction mode described later. In most cases, in the representative image of the thumbnail file, the first frame of the clip is reduced, but another frame may also be used. This is not essential, when the data does not have to be displayed at a high rate in an index screen of a user interface or the like.

A camera meta-data file is a table in which the reproduction time represented by the frame is associated with meta-data concerning the photographing of the image. At a reproduction time, it is possible to display a reproduced image to which photographing information has been added. At an edition time, it is possible to search or select the image based on the photographing information. The camera meta-data file may not have to be prepared in a case where there is not any photographing information. When the file is not required any more, the file may also be erased.

The clip information file stores information on the clip, such as a reproduction start position and reproduction end position of the clip. The clip information file is not essential in a case where the information such as the reproduction start position and the reproduction end position is not required.

The playlist whose base file name is clip0001, the video clip whose base file name is clip0002, and the video clip whose base file name is clip0003 are stored in the directory 20030601. The playlist whose base file name is clip0001 comprises three files including a playlist file clip001.lst, thumbnail file clip0001.thm, and camera meta-data file clip0001.cam. The video clip whose base file name is clip0002 comprises five files including a stream file clip0002.mpg, time map table file clip0002.tbl, thumbnail file clip0002.thm, camera meta-data file clip0002.cam, and clip information file clip0002.inf. The video clip whose base file name is clip0003 also comprises five files including a stream file clip0003.mpg, time map table file clip0003.tbl, thumbnail file clip0003.thm, camera meta-data file clip0003.cam, and clip information file clip0003.inf. From the name of the directory in which the playlist file and two video clips are stored, it can be seen that the data is recorded in Jun. 1, 2003.

Figure 17:
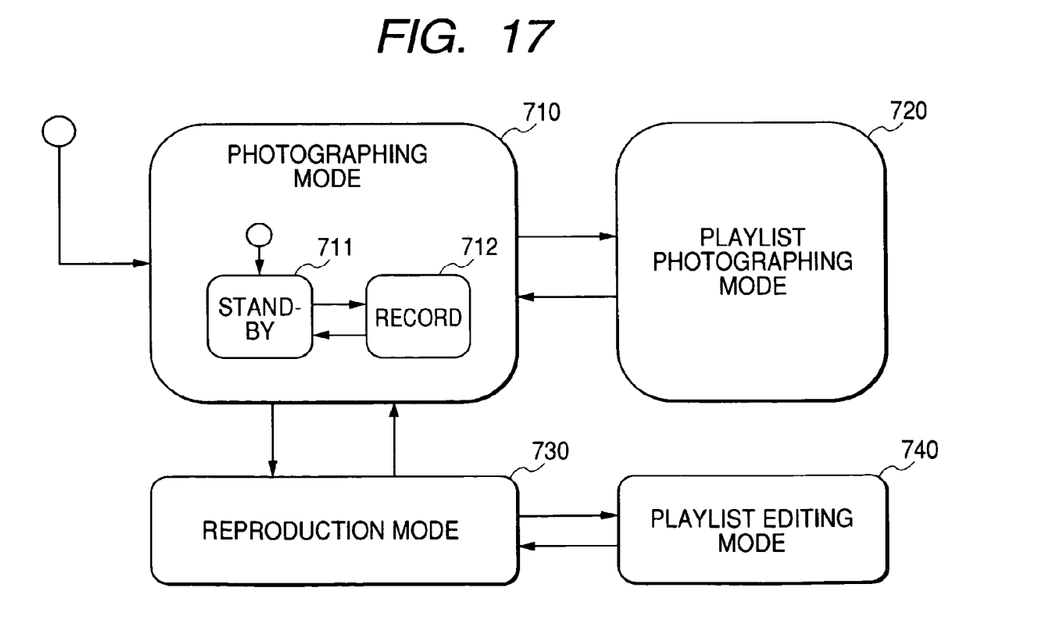
FIG. 17 is a diagram showing state transition of the photographing device in the embodiment of the present invention.

FIG. 17 is a diagram showing state transition of a recording apparatus 100 of the present embodiment.

Reference numeral 710 denotes a photographing mode for the photographing. In the present embodiment, this mode is made active, when power is turned on. The photographing mode 710 includes a stand-by state (recording temporary stop state) 711 and a recording state 712. 711 indicates a so-called camera stand-by state, and the recording can be started soon, when the user instructs the recording start in this state. When the user operates a trigger switch for the recording start/ temporary stop of the operation portion 170, Switching over between the stand-by state 711 and the recording state 712 is made.

Reference numeral 720 denotes a playlist photographing mode. When the user operates the playlist switch of the operation portion 170 in the stand-by state 711 in the photographing mode 710, the photographing mode 710 is switched over to the playlist photographing mode 720. When the playlist switch is operated in the playlist photographing mode 720, the playlist photographing mode 720 is shifted to the photographing mode 710.

Reference numeral 730 denotes a reproduction mode. When the user operates a reproduction or stop switch of the operation portion 170 or instructs index display in the reproduction mode 730, each moving image clip recorded in the media M can be reproduced. The user operates a mode switch of the operation portion 170 or the reproduction switch to switch over the photographing mode 710 to the reproduction mode 730.

Reference numeral 740 denotes a playlist editing mode. The user operates the operation portion 170 in the reproduction mode 730 to display a menu list screen in the LCD 160, and selects a playlist editing mode from the menu list screen, so that the mode can be shifted to the playlist editing mode 740. When the user operates the operation portion 170 in the playlist editing mode 740, the reproduction order of the moving image clip recorded in the media M can be changed.

Next, an operation of the system controller 190 in the photographing mode 710 will be described with reference to FIGS. 1, 2, and 8 to 12.

First, the state of each object in the stand-by state 711, and the state of the corresponding unit will be described.

An initial state of the system control object 201 in the photographing is a stand-by state. The operation detection object 202 monitors the operation portion 170. The camera control object 203 controls the camera portion 110 in the photographing state, and the camera portion 110 outputs the photographed video signal. The coding and decoding control object 204 controls both the coding portion 120 and the decoding portion 140 in an operative state, and the coding portion 120 codes the digital video signal input from the camera portion 110 to output the MPEG2 stream. The decoding portion 140 decodes the MPEG2 stream input from the driving portion 130 to output the digital video signal.

The driving control object 208 controls the driving portion 130, but here the driving portion 130 does not perform the recording, and is in the stand-by state.

The display control object 209 controls the display control portion 150, and the display control portion 150 synthesizes the digital video signal output from the decoding portion 140 with information for the user interface to display the synthesized information in the LCD 160.

Next, an operation to start the photographing assuming that the media M has the content shown in FIG. 3 and a photographing date is May 5, 2003.

On detecting the operation of the recording start/stop switch disposed in the operation portion 170, the operation detection object 202 sends a message indicating that the start/ stop switch has been operated to the system control object 201.

On receiving the message, the system control object 201 sends a message to start the recording to the contents file object 205, and the stand-by state 711 shifts to the recording state 712. On receiving the message, the contents file object 205 sends a message to acquire the current date to the date and time object 210. On receiving this message, the date and time object 210 sends May 5, 2003 as the current date to the contents file object 205. The contents file object 205 produces 20030505 as the name of the eight character contents directory from the received current date. The contents file object 205 sends to the file system object 207 a message which designates the contents directory of the name produced in the video directory to perform retrieve. On receiving this message, the file system object 207 searches the directory and sends the result to the contents file object 205. When the designated directory is found according to the received search result, the contents file object 205 moves to the directory. When the designated directory is not found, the directory is newly produced by the designated name, and the object moves to this new directory. In this case, the contents file object sends a message to produce the contents directory having name 20030505 to the file system object 207, and moves to that directory.

Figure 8:
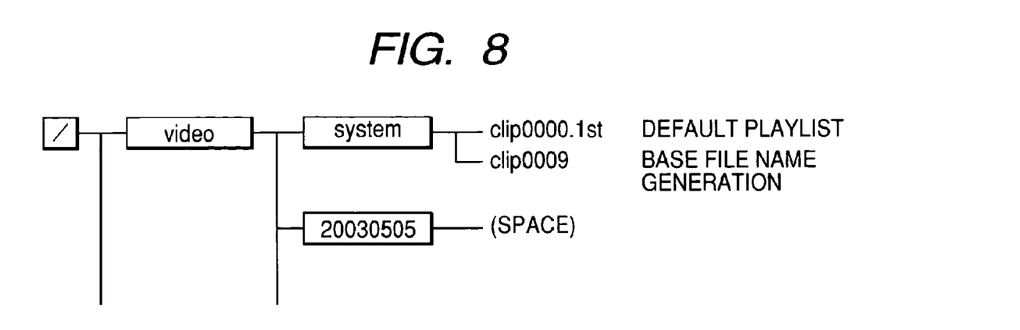
FIG. 8 is a diagram showing a structure of directory or file recorded on the recording media.

FIG. 8 is a diagram showing the states of the directory and file of the media M at this time.

The contents file object 205 sends a message to acquire an unused base file name to the base file name generation object 206. On receiving the message, the base file name generation object 206 sends a message to acquire the name of the base file name generation file in the system directory to the file system object 207. On receiving the message, the file system object 207 sends "clip0008" as the name of the base file name generation file in the system directory to the base file name generation object 206. The base file name generation object 206 updates the name of the file to clip0009 from the clip0008 in accordance with the procedure for producing the unused base file name. The base file name generation object 206 sends a message to update the name of the base file name generation file in the system directory to the file system object 207. On receiving the message, the file system object 207 updates the name of the base file name generation file in the system directory to clip0009.

On receiving the message of the unused base file name from the base file name generation object 206, the contents file object 205 produces "clip0009.lst" as the name of the playlist file from the base file name. Moreover, a message to produce the playlist file with the name is sent to the playlist object 213. The contents file object 205 stores the playlist file as a current playlist file. The contents file object 205 sends a message to add and register "clip0009.lst" to the default playlist file clip0000.lst to the playlist object 213. The playlist object 213 adds clip0009.lst to the default playlist file clip0000.lst.

The contents file object 205 sends a message to acquire the unused base file name to the base file name generation object 206. The base file name generation object 206 sends "clip00010" as the produced unused base file name to the contents file object 205. The contents file object 205 produces "clip0010.mpg" as the name of the stream file from the base file name. Moreover, a message to produce the stream file with the name is sent to the file system object 207. On receiving this message, the file system object 207 produces "clip0010.mpg" as the stream file in the directory 20030505.

The contents file object 205 produces "clip0010.tbl" as the name of the time map table file from the base file name. Moreover, a message to produce the time map table file with the name is sent to the file system object 207. On receiving this message, the file system object 207 produces "clip0010.tbl" as the time map table file in the directory 20030505. The contents file object 205 produces "clip0010.cam" as the name of the camera meta-data file from the base file name. Moreover, a message to produce the camera meta-data file with the name is sent to the file system object 207. On receiving this message, the file system object 207 produces "clip0010.cam" as the camera meta-data file in the directory 20030505.

The contents file object 205 sends a message to start the recording of the stream to the file system object 207. On receiving this message, the file system object 207 sends a message to start the recording of the MPEG2 stream to the driving control object 208.

On receiving that message, the driving control object 208 controls the driving portion 130 and starts writing the MPEG2 stream from the coding portion 120 onto the media M, and also starts writing the time map table information from the coding portion 120, and writing camera meta-data.

Figure 9:
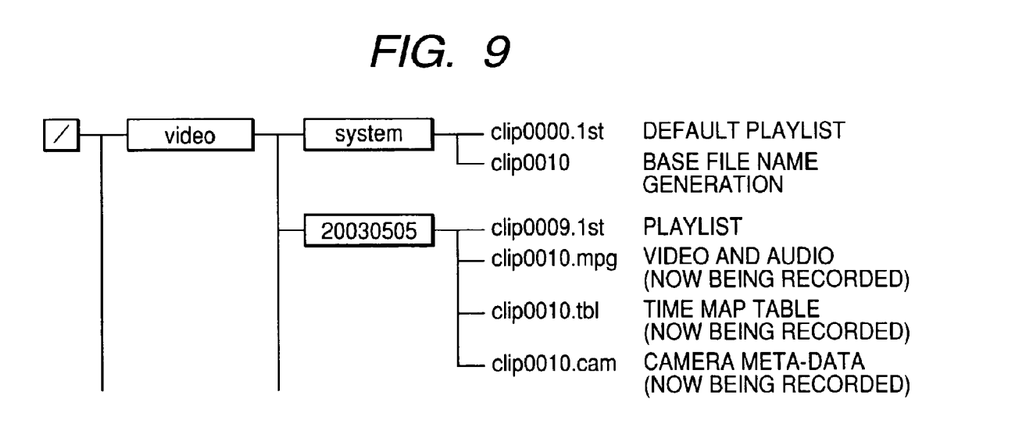
FIG. 9 is a diagram showing a structure of directory or file recorded on the recording media.

FIG. 9 is a diagram showing the states of the directory and file of the media M at this time.

On detecting the operation of the start/stop switch disposed in the operation portion 170 in this recording state, the operation detection object 202 sends a message indicating that the start/stop switch has been operated to the system control object 201.

On receiving that message, the system control object 201 sends a message to end the recording to the contents file object 205, and the recording state. 712 shifts to the stand-by state 711.

On receiving the message, the contents file object 205 sends the message to end the recording of the stream to the file system object 207. On receiving this message, the file system object 207 sends the message to end the recording operation of the MPEG2 stream to the driving control object 208. On receiving this message, the driving control object 208 controls the driving portion 130 to end writing the MPEG2 stream, time map table, and camera meta-data onto the media M.

The contents file object 205 produces "clip0010.thm" as the name of the thumbnail file from the base file name. Moreover, a message to produce the thumbnail file with the name is sent to the thumbnail object 211. On receiving this message, the thumbnail object 211 produces the thumbnail image data from the image data in the top of the clip file. Moreover, the message to produce the thumbnail file with the name designated by the contents file object 205 with respect to the image data is sent to the file system object 207.

On receiving that message, the file system object 207 produces "clip0010.thm" as the thumbnail file in directory 20030505. The contents file object 205 produces "clip0010.inf" as the name of clip information file from the base file name. Moreover, the message to produce the clip information file with the name is sent to the clip information object 212. On receiving this message, the clip information object 212 collects information on the clip file to produce the clip meta-data. Moreover, with respect to the clip meta-data, the message to produce the clip information file with the name designated by the contents file object 205 is sent to the file system object 207.

On receiving that message, the file system object 207 produces "clip0010.inf" as the clip information file in the directory 20030505. The contents file object 205 sends a message to add and register "clip0010.mpg" with respect to the stored current playlist file clip0000.lst to the playlist object 213. The playlist object 213 adds "clip0010.mpg" to the default playlist file clip0009.lst.

As described above, by a series of operation including the preparation of the directory, the generation of the base file name, the preparation of the current playlist file, the update of the default playlist file, the generation of another base file name, the generation of stream file, the preparation of the thumbnail file, the preparation of the clip information file, and the update of the current playlist file, the photographing of the clip is completed.

Figure 10:
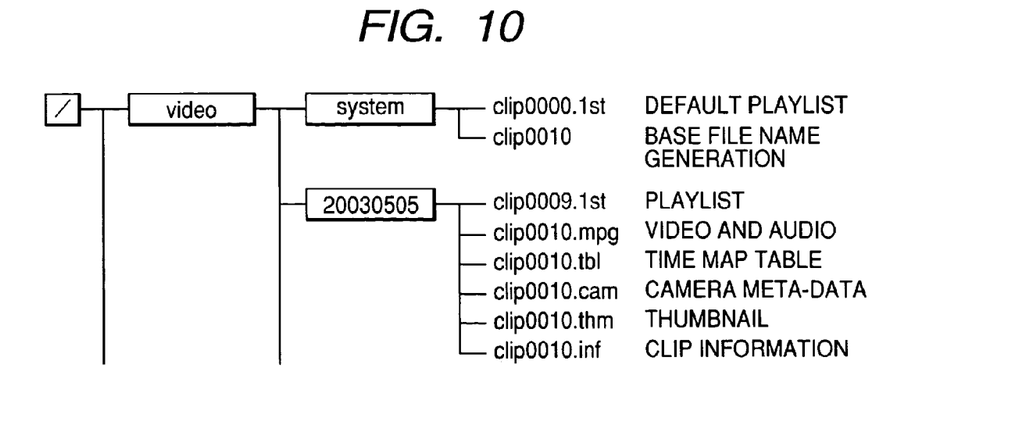
FIG. 10 is a diagram showing a structure of directory or file recorded on the recording media.

FIG. 10 shows the states of the directory and file of the media M at this time.

Next, the operation of the photographing mode 710 in a case where the photographing is continuously performed will be described.

When the photographing is continuously performed, any new playlist is not prepared. That is, by a series of operation including the generation of the base file name, the generation of the stream file, the preparation of the thumbnail file, the preparation of the clip information file, and the update of the current playlist file, the photographing of the moving image clip is completed.

Figure 5:
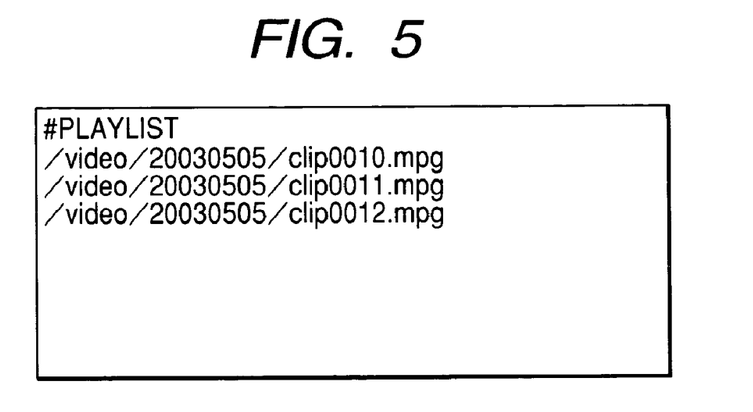
FIG. 5 is a diagram showing the content of the playlist file.
Figure 11:
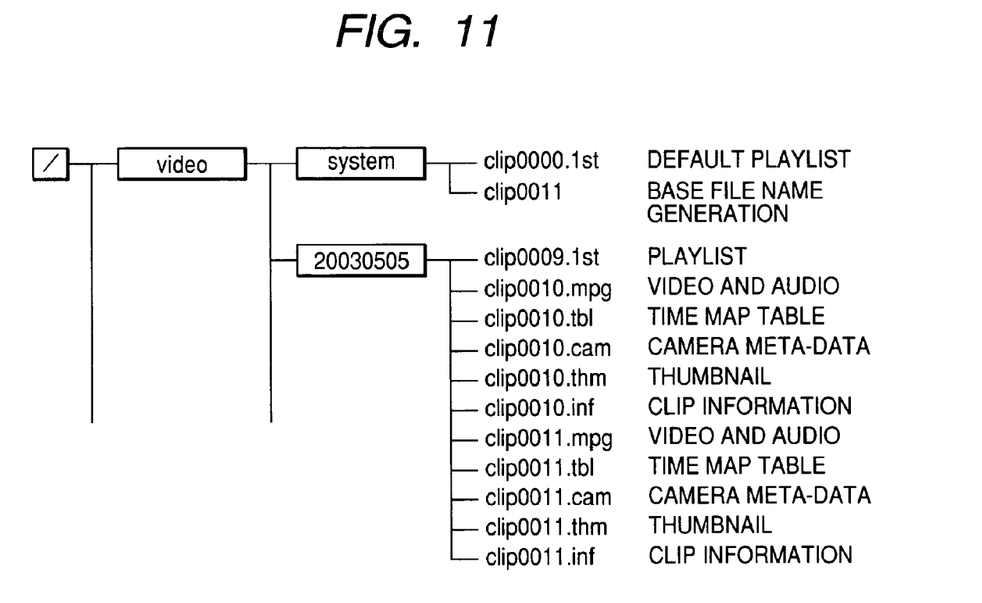
FIG. 11 is a diagram showing a structure of directory or file recorded on the recording media.
Figure 12:
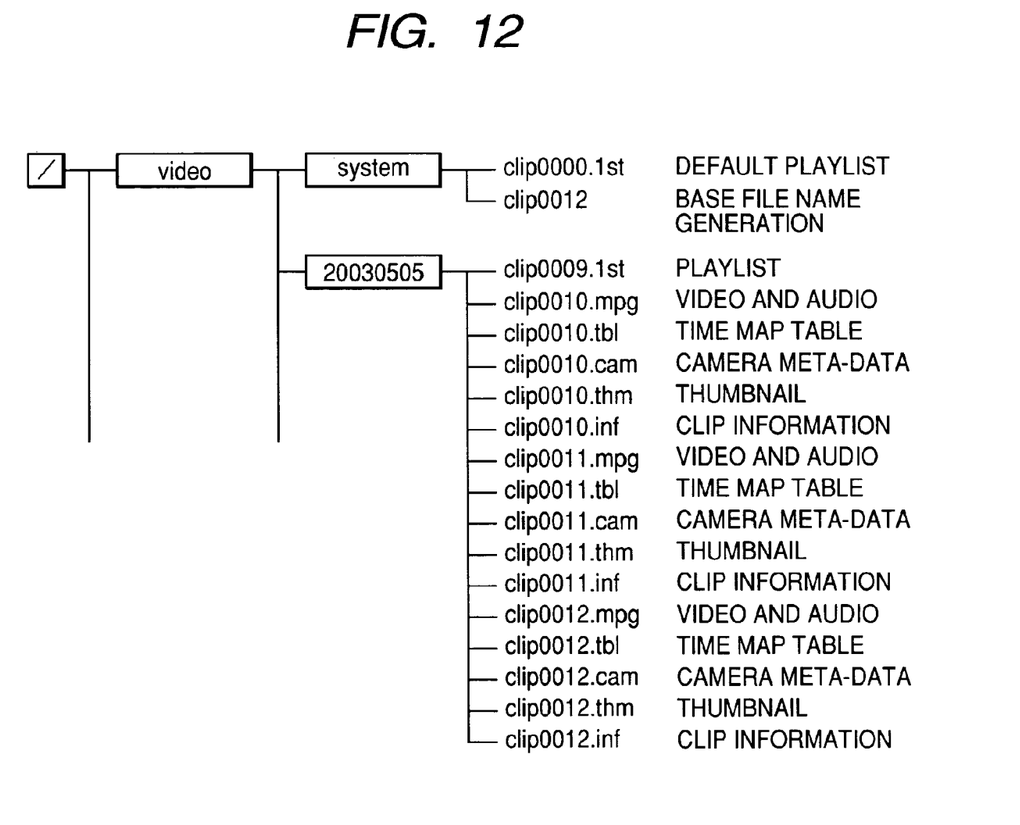
FIG. 12 is a diagram showing a structure of directory or file recorded on the recording media.

FIG. 11 is a diagram showing the states of the directory and file of the media M at this time. FIG. 12 is a diagram showing the states of the directory and file of the media M at a time when the photographing of another moving image clip is completed. FIG. 5 shows the contents of the playlist file clip0009.lst.

Figure 13:
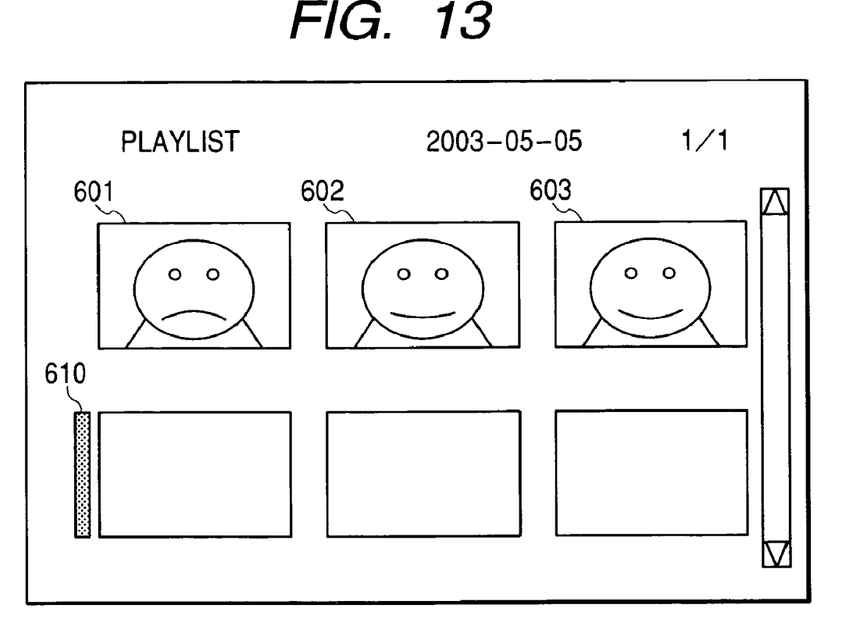
FIG. 13 is a diagram showing a GUI screen.

Next, an operation of the system controller 190 will be described with reference to FIGS. 1, 2, and 13 in a case where the mode shifts to the playlist photographing mode 720 for the user to confirm or edit the playlist.

The user operates a playlist switch of the operation portion 170 in order to interrupt the photographing mode 710 and to shift to the playlist photographing mode 720.

On detecting the operation of the playlist switch disposed in the operation portion 170, the operation detection object 202 sends a message indicating that the playlist switch has been operated to the system control object 201.

The system control object 201 sends a message to collect thumbnail images of the current playlist to the contents file object 205. On receiving this message, the contents file object 205 sends a message to read the stored current playlist file clip0009.lst to the playlist object 213. On receiving this message, the playlist object 213 sends a message to read the designated file clip0009.lst to the file system object 207, and sends the contents received from the file system object 207 to the contents file object 205.

The contents file object 205 sends a message to read the corresponding thumbnail from the received contents to the thumbnail object 211. On receiving this message, the thumbnail object 211 sends a message to read files to the file system object 207 in order to read out the corresponding thumbnails clip0010.thm, clip0011.thm, clip0012.thm, and sends the contents received from the file system object 207 to the contents file object 205. The contents file object 205 sends the images of the received thumbnails to the system control object 201.

The system control object 201 sends a message to the display control object 209 in order to produce a graphical user interface (hereinafter referred to as GUT) screen using the thumbnail image data. On receiving this message, the display control object 209 produces the data of the GUT screen for editing the playlist using the thumbnail image data, and displays the GUT screen shown in FIG. 13 on the LCD 160.

In FIG. 13, 601 to 603 denote thumbnail images of moving image clips, and 610 denotes a cursor to display a noted or operation object.

In this manner, the user can judge that three moving image clips have been recorded in the media M from the screen displayed in the LCD 160, and can confirm the content of the playlist.

Moreover, when the playlist photographing mode 720 is ended to return to the photographing mode 710, the user operates the playlist switch again.

On detecting the operation of the playlist switch disposed in the operation portion 170, the operation detection object 202 sends a message indicating that the playlist switch has been operated to the system control object 201.

The system control object 201 sends a message to erase the GUT screen and to display a video signal from the camera portion 110 to the display control object 209. On receiving this message, the display control object 209 erases the GUI screen for editing the playlist from the LCD 160, and displays the moving image from the camera portion 110 instead.

By the above-described operation, the user ends the playlist photographing mode 720 to return to the photographing mode 710.

Figure 6:
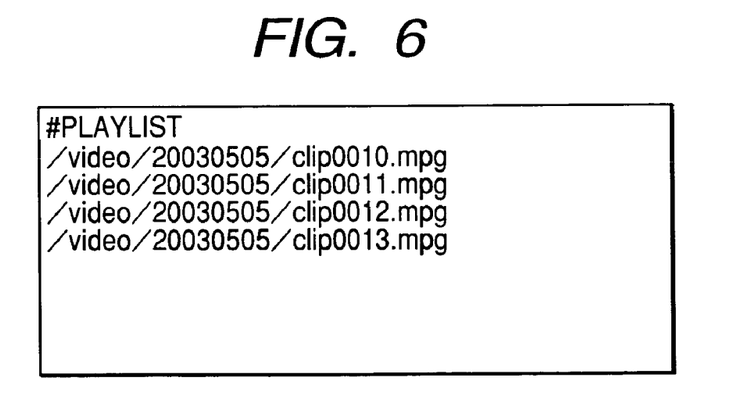
FIG. 6 is a diagram showing the content of the playlist file.

FIG. 6 is a diagram showing the contents of the playlist file clip0009.lst after photographing another moving image clip.

The operation of the system controller 190 in a case where the user shifts back to the playlist photographing mode 720 will be described hereinafter with reference to FIGS. 1, 14 to 16.

The user operates the playlist switch to interrupt the photographing mode 710 again and to shift to the playlist photographing mode 720.

The system controller 190 performs an operation similar to the above-described operation to shift to the playlist photographing mode 720.

Figure 14:
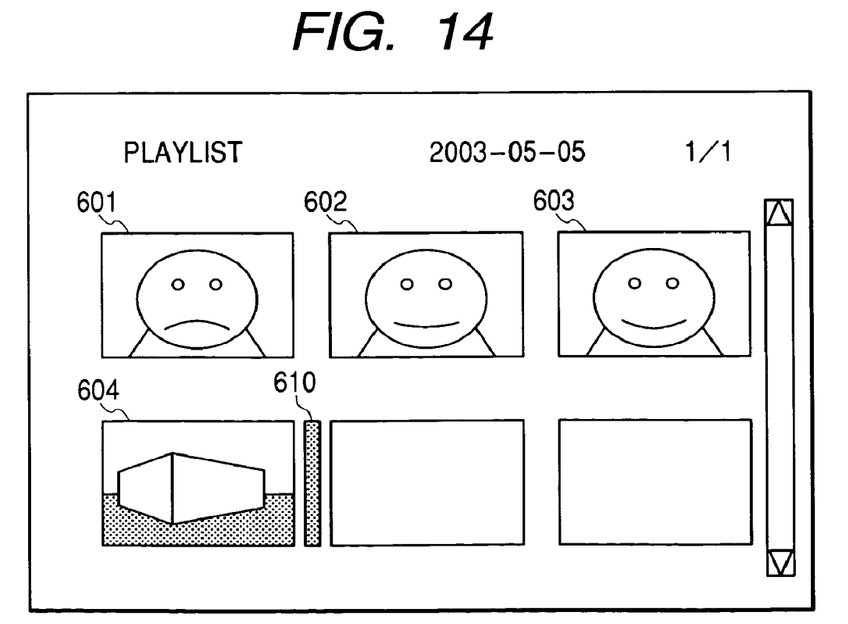
FIG. 14 is a diagram showing the GUI screen.

FIG. 14 is a diagram showing the GUI screen displayed on the LCD 160 as a result.

In FIG. 14, reference numerals 601 to 604 denote thumbnail images of the moving image clip, and 610 denotes a cursor for displaying the noted or operation object. In FIG. 14, it can be seen that the clip 604 is added and recorded from the state of FIG. 13. When the new moving image clip is to be photographed in this manner, the reproduction procedure is automatically added to the playlist in such a manner that the newly photographed moving image clip is reproduced last in the reproduction order.

In the playlist photographing mode 720, it is possible to replace, duplicate, and delete the moving image clip using the displayed thumbnail image and each operation switch of the operation portion 170 in the same manner as in the playlist editing mode 740. Furthermore, in the playlist photographing mode 720, the user can optionally designate the reproduction position (reproduction order) of the clip to be photographed next in the playlist displayed in FIG. 14.

That is, when the user wants to change the reproduction position of the moving image clip to be photographed next into between the clips 602 and 603, the user operates a cursor moving key disposed in the operation portion 170 to move the cursor 610 to a position between the thumbnails 602 and 603. Accordingly, the reproduction position of the moving image clip to be photographed next in the playlist can be changed.

Figure 15:
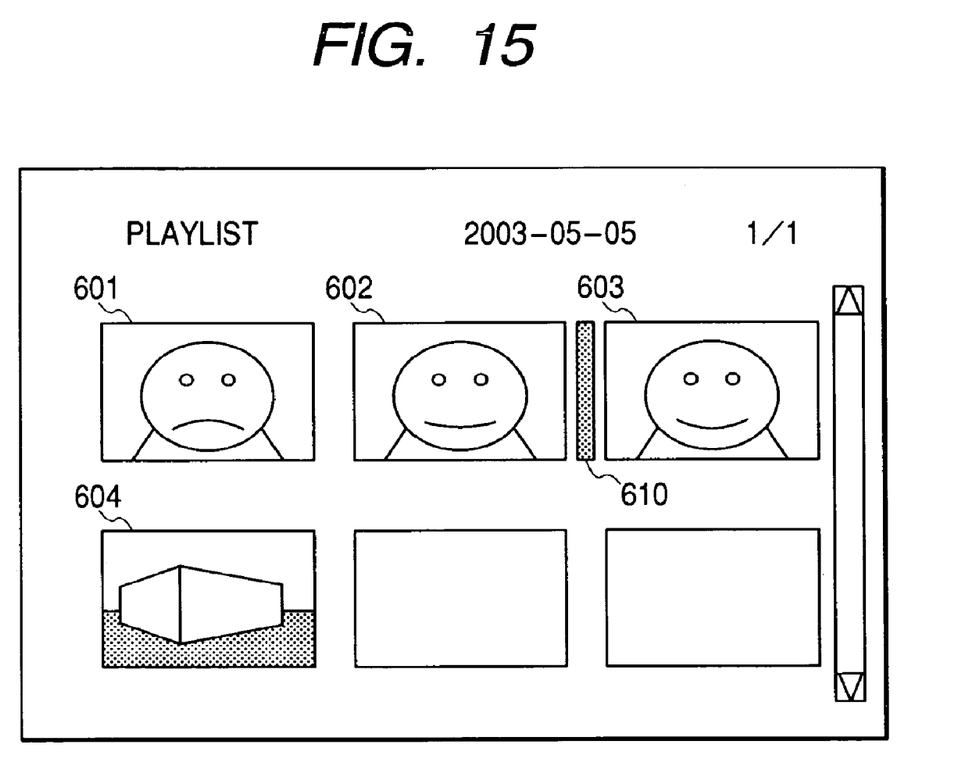
FIG. 15 is a diagram showing the GUI screen.

FIG. 15 is a diagram showing the GUI screen in a state in which the cursor 610 is moved to a position between the thumbnails 602 and 603.

In this state, the user operates the playlist switch to end the playlist photographing mode 720 and to return to the photographing mode 710.

The system controller 190 performs an operation similar to the above-described operation, and ends the playlist photographing mode 720 to shift to the photographing mode 710.

Figure 7:
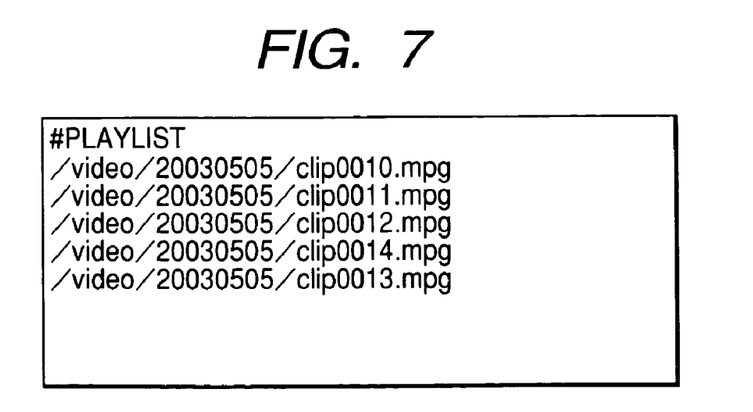
FIG. 7 is a diagram showing the content of the playlist file.
Figure 16:
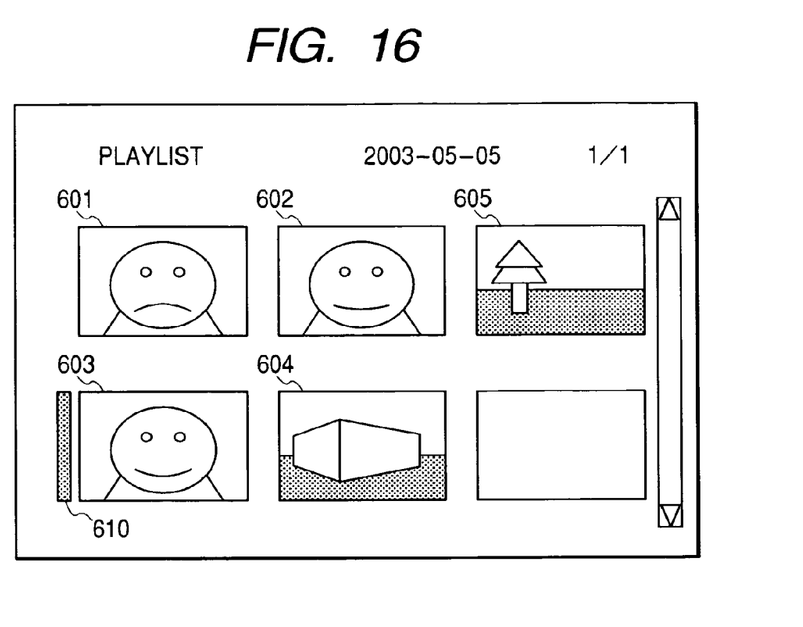
FIG. 16 is a diagram showing the GUI screen.

FIG. 7 is a diagram showing the contents of the playlist file clip0009.lst after newly photographing the moving image clip in this state. FIG. 16 is a diagram showing the GUI screen displayed on the LCD 160 in a case where the mode is shifted to the playlist photographing mode 720 at this time.

In FIG. 16, reference numerals 601 to 605 denote the thumbnail images of the moving image clips, and 610 denotes a cursor for displaying an object to be subjected to operation.

It can be confirmed that the thumbnail image of the last photographed moving image clip is denoted by 605, and the reproduction position is between the thumbnails 602 and 603.

As described above, according to the present embodiment, since the control means include the playlist mode as a sub-mode of the photographing mode, the reproduction order can be confirmed or changed immediately after the photographing, and it is possible to perform the photographing immediately after confirming or changing the reproduction order.

Moreover, after producing and recording the moving image clip by the photographing, the thumbnail of the moving image clip in the playlist indicating the reproduction order is displayed during a photographing stand-by state, and accordingly the contents of the playlist can be easily confirmed during the photographing.

Furthermore, in the playlist photographing mode, not only the clip recorded in the media but also the reproduction position of the clip to be photographed next can be optionally designated, and therefore the reproduction procedure does not have to be changed after the photographing.

It is to be noted that in the above-described embodiment, the playlist switch is operated in the stand-by state (recording temporary stop state) to shift to the playlist editing mode. Additionally, for example, a recording start/stop switch is operated in the recording state 712 to shift to the stand-by state 711, so that the mode may automatically shift to the playlist editing mode to display the GUI screen of FIGS. 13, 14 in the LCD 160.

Moreover, after shifting to the playlist photographing mode to start the display of the GUI screen, the display of the thumbnail image is automatically stopped after an elapse of a predetermined time, and the moving image input from the camera portion 110 may be displayed on the LCD 160. According to the constitution, every time the photographing of the clip is completed, the thumbnail of the playlist photographed to this extend is displayed for a predetermined time. The user can also confirm current of the photographing, which has heretofore been impossible. Furthermore, the photographing may also be continuously performed.

Furthermore, even in the playlist editing mode 740 in FIG. 17, the mode can be shifted to the photographing mode 710 during the editing of the playlist. According to the constitution, new clip can be easily added to the playlist. For example, when a handwritten title or the like is inserted, the cursor is moved to a target place of the playlist in the playlist editing mode, the mode is switched to the photographing mode as such, and the title is photographed. This operation is possible with a comparatively simple operation.

Moreover, in case that the function of the playlist photographing mode 720 is common to that of the playlist editing mode 740, these modes may also be set to the same mode.

The present embodiment can be realized by causing a computer to execute program. The means for supplying the program to the computer, such as a recording medium readable by computers such as CD-ROM, in which the program is recorded, and transmission media such as internet for transmitting the program, may also be applied as the embodiment of the present invention. A computer program product such as a recording medium in which the program is recorded and which is readable by the computer may also be applied as the embodiment of the present invention. The above-described program, recording medium, transmission medium, and computer program product are included in a category of the present invention. Available examples of the recording medium include a flexible disc, hard disk, optical disc, magneto-optical disc, CD-ROM, magnetic tape, nonvolatile memory card, ROM and the like.

It is to be noted that the above-described embodiment is just an example of illustration for carrying out the present invention, and a technical scope of the present invention cannot be interpreted in a limited manner. That is, the present invention can be carried out in various forms without departing from technical thoughts or major characteristics.

What is claimed is:

1. A recording apparatus comprising:
   a recording unit that records image data on a recording medium;
   a playlist processing unit that produces playlist data indicating a reproduction procedure of a plurality of the image data recorded on the recording medium; and
   a controller that displays representative images respectively indicating a plurality of the image data designated in the playlist, in such a manner that the displayed representative images are arranged in an order designated by the playlist,
   wherein the controller displays an indicator indicating a reproduction position of the image data to be recorded next by the recording unit between adjacent ones of the displayed representative images that are arranged in the order designated by the playlist, and the controller further controls the playlist processing unit so as to change the playlist in accordance with the image data to be recorded next by the recording unit so that the image data recorded next by the recording unit is reproduced between the image data indicated by the displayed representative image data preceding the displayed indicator and the image data indicated by the displayed representative image subsequent to the displayed indicator.

2. An apparatus according to claim 1, wherein the controller displays the representative image before start of the recording the image data by the recording unit.

3. An apparatus according to claim 1, wherein the playlist processing unit changes the contents of the playlist data every time the recording unit records the image data.

4. An apparatus according to claim 1, further comprising:
   a playlist display instruction unit that instructs to display the representative image before start of the recording the image data by the recording unit,
   wherein the controller displays the representative image on the display device in accordance with the instruction of the playlist display instruction unit.

5. An apparatus according to claim 1, wherein the controller stops displaying the representative image in response to an elapse of a predetermined period after start of displaying the representative image.

6. An apparatus according to claim 1, wherein the controller displays the representative image of the plurality of the image data at a position corresponding to a reproduction order designated in the playlist.

7. An apparatus according to claim 1, further comprising:
   an input unit that inputs image data obtained by a photographing unit,
   wherein the recording unit records the image data input by the input unit, and
   wherein the controller selectively displays the image data input from the input unit and the representative image, before start of the recording the image data by the recording unit.

* * * * *